(12) United States Patent
Tinnakornsrisuphap et al.

(10) Patent No.: US 8,923,244 B2
(45) Date of Patent: Dec. 30, 2014

(54) SYSTEMS AND METHODS OF ADVERTISING HANDOFF

(75) Inventors: Peerapol Tinnakornsrisuphap, San Diego, CA (US); Sanjiv Nanda, Ramona, CA (US); Srinivasan Balasubramanian, San Diego, CA (US); Chandrasekhar Therazhandur Sundarraman, San Diego, CA (US); Peter Hans Rauber, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 12/854,547

(22) Filed: Aug. 11, 2010

(65) Prior Publication Data

US 2011/0194530 A1  Aug. 11, 2011

Related U.S. Application Data

(60) Provisional application No. 61/233,276, filed on Aug. 12, 2009.

(51) Int. Cl.
| | |
|---|---|
| *H04W 36/04* | (2009.01) |
| *H04W 36/00* | (2009.01) |
| *H04W 36/14* | (2009.01) |
| *H04W 84/04* | (2009.01) |
| *H04W 88/10* | (2009.01) |

(52) U.S. Cl.
CPC .......... *H04W 36/04* (2013.01); *H04W 36/0066* (2013.01); *H04W 36/14* (2013.01); *H04W 84/045* (2013.01); *H04W 88/10* (2013.01); *H04W 36/0083* (2013.01)
USPC ........................................ 370/331

(58) Field of Classification Search
CPC ........................ H04W 48/16; H04W 36/0066
USPC ............................................ 370/331; 455/444
See application file for complete search history.

(56) References Cited

U.S. PATENT DOCUMENTS

| | | | | |
|---|---|---|---|---|
| 7,145,890 | B1 * | 12/2006 | Seo et al. ...................... | 370/331 |
| 7,924,785 | B2 * | 4/2011 | Shaheen et al. ............... | 370/331 |

(Continued)

FOREIGN PATENT DOCUMENTS

| | | |
|---|---|---|
| JP | 2003235064 A | 8/2003 |
| JP | 2006060817 A | 3/2006 |

(Continued)

OTHER PUBLICATIONS

International Search Report and Written Opinion—PCT/US2010/045399, International Search Authority—European Patent Office—Dec. 14, 2010.

(Continued)

*Primary Examiner* — Rasheed Gidado

(57) ABSTRACT

A heterogeneous communication system enables femto Access Points (APs) to advertise handoff related information on a first Radio Access Technology (RAT), such as for receipt by a multi mode mobile device (e.g., a mobile device capable of operation on a plurality of RATs), wherein the handoff related information permits the multi mode mobile device to identify the femto access point on a second RAT. The multi mode mobile device can be connected to a macro node (e.g., a macro base station, an evolved Base Node, etc.) using the first RAT via a Wireless Wide Area Network (WWAN) air-interface (e.g., 1×, HRPD, eHRPD), while independently reading/decoding overhead messages on the second RAT for connection thereto (e.g., connection to the femto access point on the second RAT.) The second RAT can be another WWAN, a Wireless Local Access Network (WLAN) or a Personal Access Network.

50 Claims, 11 Drawing Sheets

(56) References Cited

U.S. PATENT DOCUMENTS

| | | | |
|---|---|---|---|
| 7,957,352 B2* | 6/2011 | Vanghi et al. | 370/335 |
| 8,121,089 B2* | 2/2012 | Bao et al. | 370/331 |
| 8,121,634 B2* | 2/2012 | Aoyama et al. | 455/550.1 |
| 8,291,625 B2* | 10/2012 | Lee et al. | 37/331 |
| 8,315,646 B2* | 11/2012 | Karjalainen | 455/456.1 |
| 8,743,858 B2 | 6/2014 | Tinnakornsrisuphap et al. | |
| 2004/0204035 A1* | 10/2004 | Raghuram et al. | 455/553.1 |
| 2005/0073977 A1* | 4/2005 | Vanghi et al. | 370/335 |
| 2006/0040656 A1 | 2/2006 | Kotzin | |
| 2008/0132234 A1* | 6/2008 | Gilliland | 455/436 |
| 2008/0176568 A1* | 7/2008 | Palanki et al. | 455/436 |
| 2008/0227456 A1* | 9/2008 | Huang et al. | 455/436 |
| 2008/0316941 A1 | 12/2008 | Jung et al. | |
| 2009/0016300 A1* | 1/2009 | Ahmavaara et al. | 370/331 |
| 2009/0042601 A1* | 2/2009 | Wang et al. | 455/553.1 |
| 2009/0196253 A1 | 8/2009 | Semper | |
| 2009/0209256 A1* | 8/2009 | Nakashima et al. | 455/436 |
| 2009/0279503 A1* | 11/2009 | Chin et al. | 370/331 |
| 2009/0279504 A1* | 11/2009 | Chin et al. | 370/331 |
| 2009/0303966 A1* | 12/2009 | Cherian et al. | 370/331 |
| 2010/0008324 A1* | 1/2010 | Lee et al. | 370/331 |
| 2010/0040019 A1 | 2/2010 | Tinnakornsrisuphap et al. | |
| 2010/0048216 A1 | 2/2010 | Sundarraman et al. | |
| 2010/0165947 A1* | 7/2010 | Taniuchi et al. | 370/331 |
| 2011/0189986 A1 | 8/2011 | Tinnakornsrisuphap et al. | |
| 2011/0189995 A1 | 8/2011 | Tinnakornsrisuphap et al. | |

FOREIGN PATENT DOCUMENTS

| | | |
|---|---|---|
| KR | 20110026644 A | 3/2011 |
| WO | WO2005089249 | 9/2005 |

OTHER PUBLICATIONS

Tiedemann E G: "Femtocell Activities in 3GPP2 TSG-C", 3rd Generation Partnership Project (3GPP); Technical Specification Group (TSG) Radio Access Network (RAN); Workinggroup 2 (WG2), XX, XX, [Online] Mar. 31, 2009, pp. 1-18, XP002599307, Retrieved from the Internet: URL:fttp://ftp.3gpp2.org/TSGX/Working/2009 /2009-03-New%20rleans/All%20TSG%20Femto%20Discussion/XSI-20090331-004_T SG-C_Femto%200vervi ew-090330.p> [retrieved on Sep. 2, 2010].

Taiwan Search Report—TW099126981—TIPO—May 13, 2013.

Co-pending U.S. Appl. No. 14/295,801, filed Jun. 4, 2014.

* cited by examiner

_US 8,923,244 B2_

SYSTEMS AND METHODS OF ADVERTISING HANDOFF

CLAIM OF PRIORITY UNDER 35 U.S.C. §119

The present application for patent claims priority to Provisional Application No. 61/233,276 entitled "Systems and Methods of Advertising Handoff" filed 12 Aug. 2009, and assigned to the assignee hereof and hereby expressly incorporated by reference herein.

BACKGROUND

1. Field

The present disclosure relates generally to wireless voice communication, and more specifically to techniques for performing a hand-in from a macro node to a femto node in a heterogeneous communication network.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers (RNCs) which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and RNCs. The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1X, CDMA2000 EV-DO Rev. 0, CDMA2000 EV-DO Rev. A, and CDMA2000 EV-DO Rev. B. All are approved radio interfaces for the ITU's IMT-2000. CDMA2000 has a relatively long technical history and is backward-compatible with its previous 2G iteration IS-95 (cdmaOne).

CDMA2000 1X (IS-2000), also known as 1x and 1xRTT, is the core CDMA2000 wireless air interface standard. The designation "1x", meaning 1 times Radio Transmission Technology, indicates the same RF bandwidth as IS-95: a duplex pair of 1.25 MHz radio channels. 1xRTT almost doubles the capacity of IS-95 by adding 64 more traffic channels to the forward link, orthogonal to (in quadrature with) the original set of 64. The 1X standard supports packet data speeds of up to 153 kbps with real world data transmission averaging 60-100 kbps in most commercial applications. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1xEV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by Third Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Dual mode (or multimode) mobiles refer to mobile phones that are compatible with more than one form of data transmission or network, as contrasted with single-mode mobiles. For instance, a dual-mode phone can be a telephone which supports more than one technique for sending and receiving voice and data. This could be for wireless mobile phones or for wired phones.

In one aspect, the dual mode can refer to network compatibility, such as mobile phones containing two types of cellular radios for voice and data. These phones include combination of GSM (Global System for Mobile Communications) and CDMA technology. They can be used as a GSM or CDMA phone according to user preference. These handsets are also called global phones and are essentially two phones in one device. For this particular example of a dual mode CDMA2000 and GSM phone, there are two possibilities, either two cards (R-UIM and SIM) or one card (SIM-only) where the R-UIM information is stored in the Mobile Equipment (handset shell).

In another aspect, a dual mode mobile can use both cellular and non-cellular radios for voice and data communication. There are also two types of dual mode phones which use cellular radio that contain GSM/CDMA/W-CDMA as well as other technology like IEEE 802.11 (Wi-Fi) radio, WiMAX, or DECT (Digital Enhanced Cordless Telecommunications) radio. These phones can be used as cellular phones when connected to a wide area cellular network. When within range of a suitable Wi-Fi or DECT network, the phone can be used as a Wi-Fi/DECT phone for all communications purposes. This method of operation can reduce cost (for both the network operator and the subscriber), improve indoor coverage and increase data access speeds.

Wi-Fi is a subset of wireless local area network (WLAN) that links devices via a wireless distribution method (typically spread-spectrum or OFDM) and usually provides a connection through an access point to the wider Internet. This gives users the mobility to move around within a local coverage area and still be connected to the network.

WiMAX, an acronym for Worldwide Interoperability for Microwave Access, is a telecommunications technology that provides fixed and fully mobile internet access. WiMAX is based on the IEEE 802.16 standard (also called Broadband Wireless Access). The name "WiMAX" was created by the WiMAX Forum, which was formed in June 2001 to promote conformity and interoperability of the standard. The forum describes WiMAX as "a standards-based technology enabling the delivery of last mile wireless broadband access as an alternative to cable and DSL".

Typically, for an active (e.g., connected) handoff of a Mobile Station/Access Terminal (MS/AT) from macro base stations or access networks to a femtocell, the macro system needs to be able to uniquely identify the target femto access point. Conventional solutions, such as in 1× Rev E, require that the MS reads the Access Point Identification Message (APIM) from the target femtocell. Nonetheless, the MS is not required to read 1× paging channel while connected, and reading 1× paging channel and decode overhead messages from non-serving sector requires a separate state machine to process the message. A similar solution also exists for UMTS and LTE UEs in 3GPP Release 9 specification where the unique femtocell identifier is advertised in the System Information Block (SIB). Such is also likely to cause interruption to the active connection.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a mobile station or access terminal (MS/AT) and a femtocell that are multi-mode, e.g. using two different Radio Access Technologies (RATs) (e.g., 1× and HRPD (High Rate Packet Data), or 1× and LTE, or HRPD and LTE, or UMTS and LTE), and that are not likely to be connected to each RAT simultaneously. An idle mode procedure including reading of overhead messages of another RAT in the MS/AT can occur independently of the connected RAT to facilitate an active handoff.

In one aspect, a method is provided for performing a handoff in a heterogeneous network of a mobile station that is connected via an air-interface. A mobile station connects to a source node using a first radio access technology. The mobile station detects a signal from a target node using a second radio access technology. The mobile station performs a handoff from the source node to the target node.

In another aspect, at least one processor is provided for performing a handoff in a heterogeneous network of a mobile station that is connected via an air-interface. A first module connects to a source node by a mobile station to conduct using a first radio access technology. A second module detects a signal from a target node using a second radio access technology. A third module performs a handoff from the source node to the target node.

In an additional aspect, a computer program product is provided for performing a handoff in a heterogeneous network of a mobile station that is connected via an air-interface. A non-transitory computer-readable storage medium comprises sets of codes. A first set of codes causes a computer to connect to a source node by a mobile station to conduct using a first radio access technology. A second set of codes causes the computer to detect a signal from a target node using a second radio access technology. A third set of codes causes the computer to perform a handoff from the source node to the target node.

In a further aspect, an apparatus is provided for performing a handoff in a heterogeneous network of a mobile station that is connected via an air-interface. The apparatus comprises means for connecting to a source node by a mobile station to conduct using a first radio access technology. The apparatus comprises means for detecting a signal from a target node using a second radio access technology. The apparatus comprises means for performing a handoff from the source node to the target node.

In yet another aspect, an apparatus is provided for performing a handoff in a heterogeneous network of a mobile station that is connected via an air-interface. A first transceiver connects to a source node by a mobile station to conduct using a first radio access technology. A second transceiver detects a signal from a target node using a second radio access technology concurrently with the first transceiver using the first radio access technology. A computing platform performs a handoff from the source node to the target node.

In yet an additional aspect, a method is provided for performing a handoff in a heterogeneous network of a mobile station that is connected via an air-interface. A target node transmits handoff information in a message on a first radio access technology, wherein the handoff information includes information for connecting to the target node on a second radio access technology. The target nodes receives on the second radio access technology a handoff of an active call of a mobile station from a source node on the second radio access technology based on the handoff information in the message on the first radio access technology.

In one aspect, at least one processor is provided for performing a handoff in a heterogeneous network of a mobile station that is connected via an air-interface. A first module transmits, by a target node, handoff information in a message on a first radio access technology, wherein the handoff information includes information for connecting to the target node on a second radio access technology. A second module receives, at the target node on the second radio access technology, a handoff of an active call of a mobile station from a source node on the second radio access technology based on the handoff information in the message on the first radio access technology.

In another aspect, a computer program product is provided for performing a handoff in a heterogeneous network of a mobile station that is connected via an air-interface. A non-transitory computer-readable medium stores sets of code. A first set of codes causes a computer to transmit, by a target node, handoff information in a message on a first radio access technology, wherein the handoff information includes information for connecting to the target node on a second radio access technology. A second set of codes causes the computer to receive, at the target node on the second radio access technology, a handoff of an active call of a mobile station from a source node on the second radio access technology based on the handoff information in the message on the first radio access technology.

In an additional aspect, an apparatus is provided for performing a handoff in a heterogeneous network of a mobile station that is connected via an air-interface. The apparatus comprises means for transmitting, by a target node, handoff information in a message on a first radio access technology, wherein the handoff information includes information for connecting to the target node on a second radio access technology. The apparatus comprises means for receiving, at the target node on the second radio access technology, a handoff of an active call of a mobile station from a source node on the second radio access technology based on the handoff information in the message on the first radio access technology.

In a further aspect, an apparatus for performing a handoff in a heterogeneous network of a mobile station that is connected via an air-interface. A first transceiver transmits, by a target node, handoff information in a message on a first radio access technology, wherein the handoff information includes information for connecting to the target node on a second radio access technology. A second transceiver receives, at the target node on the second radio access technology, a handoff of an active call of a mobile station from a source node on the second radio access technology based on the handoff information in the message on the first radio access technology.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 3A illustrates a block diagram of a system comprising logical groupings of electrical components of a multimode mobile station for performing an active hand-in.

FIG. 3B illustrates a block diagram of a system comprising logical groupings of electrical components of a multimode femto node for performing an active hand-in.

FIG. 4A illustrates a block diagram of an apparatus of a multimode mobile station for performing an active hand-in.

FIG. 4B illustrates a block diagram of an apparatus of a multimode femto node for performing an active hand-in.

DETAILED DESCRIPTION

Figure 1:
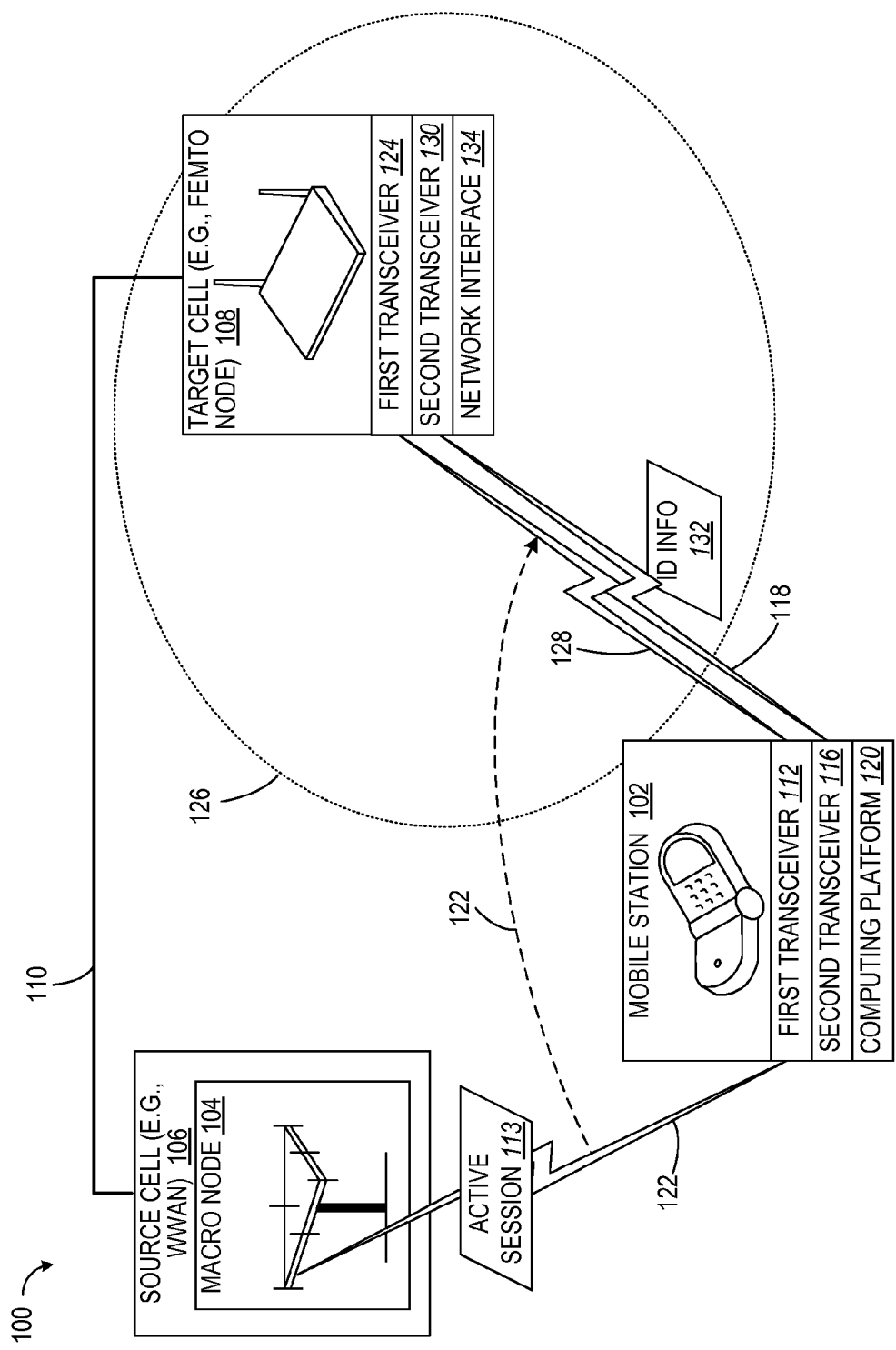
FIG. 1 illustrates a schematic diagram of a heterogeneous communication system or network wherein a mobile station performs an active hand-in from a macro node to a femto node by simultaneously using two Radio Access Technologies (RATs).

For active (i.e., connected) handoff of a Mobile Station or Access Terminal (MS/AT) from a macro base station or access network to a femtocell, also known and used interchangeably as femto node or femto access point, the macro system needs to be able to uniquely identify the target femto access point. While it is possible to advertise the information that uniquely identifies the femtocell on the overhead channel of the Radio Access Technology (RAT) that is active (serving) and that the macro base station needs to handoff the MS/AT, the MS/AT needs to read overhead from the non-serving pilot of the femto access point. That will also lead to some interruption in the traffic on the serving pilot.

However, MS/ATs and femto access points are likely to be multi-mode (e.g., 1× and HRPD, or 1× and LTE, or HRPD and LTE, or UMTS and LTE). Moreover, different RATs in an MS/AT are not likely to be connected simultaneously. Thus, the MS/AT can perform an idle mode procedure of reading the overhead messages of another RAT independent of the connected RAT. For each femto overhead message in each radio technology supported on the femto Access Point (AP), the femto AP can advertise information to assist a connected handoff to another RAT.

Currently, an MS/AT is not required to read the 1× paging channel while connected; reading the 1× paging channel and decoding overhead messages from a non-serving sector requires a separate state machine to process the message. Further, such a procedure also likely will cause interruption to the active connection.

The present innovation discloses advertising handoff information in a complementary technology so that an active (i.e., connected) handoff of an MS/AT can be made from macro base stations or access networks or a source femto access point to a target femto access point. In one aspect, the source system needs to uniquely identify the target femto access point. Complementary technologies can include different cellular technologies (e.g., 1× and HRPD (High Rate Packet Data), or 1× and LTE, or HRPD and LTE, or UMTS and LTE) that preclude simultaneous reception on one radio receiver. Complementary technologies can also include one cellular technology and another non-cellular technology, such as WiMAX, Wi-Fi, Zigbee, and BLUETOOTH In an exemplary aspect, the MS/AT reads the Access Point Identification Message (APIDM) from the target femto access point using an unused mode of a multimode device. For example, the APIDM in HRPD can advertise a mobile switching center (MSC) identifier (ID), such as an IOS_MSC_ID, or a cell identifier, such as an IOS_CELL_ID, or Groups of Pilot Pseudo Noise (PNs) for assisting 1× Active Hand-in. Similarly, the APIDM in 1× can also advertise Groups of Pilot PNs for assisting HRPD Active Hand-in.

In another exemplary aspect, a collocated HRPD/LTE femto access point can be identified for hand-in using a system information block (SIB) in LTE to advertise HRPD subnet information.

As for timing, the reading of the message by the MS/AT in the idle RAT can occur naturally if that idle RAT already performs idle handoff, e.g., the MS/AT monitors a 1× Page even when MS/AT is active on HRPD. Otherwise, based on APPIM (Access Point Pilot Information Message) on an active RAT, the MS/AT could know that it is in femto access point coverage and in response triggers monitoring of the idle RAT to listen for overhead information. To this end, handoff supplementary information for the complementing technology (e.g., LTE, WiMax, Wi-Fi, Bluetooth, Zigbee, etc.) is included on both 1× and HRPD APIDM.

In an additional aspect, the MS/AT may be triggered to use an idle RAT to establish a traffic connection and then the handoff information is communicated via a data message. For example, the data message could be part of information exchanged in an IP service discovery protocol such as Universal Plug and Play (UPnP).

In a further aspect, the MS/AT may borrow some transceiver resources from the connected RAT to perform decoding of a second RAT. The resources could be a receiver chain or a demodulation finger in a rake (anti-multipath) receiver.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

In FIG. 1, in a heterogeneous communication system or network 100, a mobile station (MS) or device 102 can access voice services via a source cell, depicted as a macro node 104 of a Wireless Wide Area Network (WWAN) 106. In order to extend coverage or to provide lower cost access, the MS 102 can also receive service from a target cell, depicted as a femto node 108 that connects to the WWAN 106 over a backhaul network 110. In one aspect, an apparatus performs a handoff in the heterogeneous network 100. In particular, a first transceiver 112 of the MS 102 connects to the macro node 104 to conduct an active session 113 over a macro air-interface 114 using a first Radio Access Technology (RAT). A second transceiver 116 detects a signal 118 from the femto node 108 using a second RAT concurrently with the first transceiver 112 using the first RAT. A computing platform 120 performs an active hand-in procedure, depicted at 122, from the macro node 104 to the femto node 108.

In support thereof, an apparatus depicted as the femto node 108 has a first transceiver 124 that serves a femtocell 126 via a local air-interface 128 using the first RAT. A second transceiver 130 advertises on the second RAT identifying information 132 for the local air-interface 128 of the first RAT. A network interface 134 performs the hand-in procedure 122 for an active connection from the macro node 104 for the MS 102 that received the identifying information 132 while connected to the macro node 104 using the first RAT.

It should be appreciated with the benefit of the present disclosure that handoffs that can benefit from the disclosed innovation can include a handoff between macrocells, a handoff between femto cells, a hand-in from a macrocell to a femto cell, and a handout from a femto cell to a macrocell.

Figure 2A:
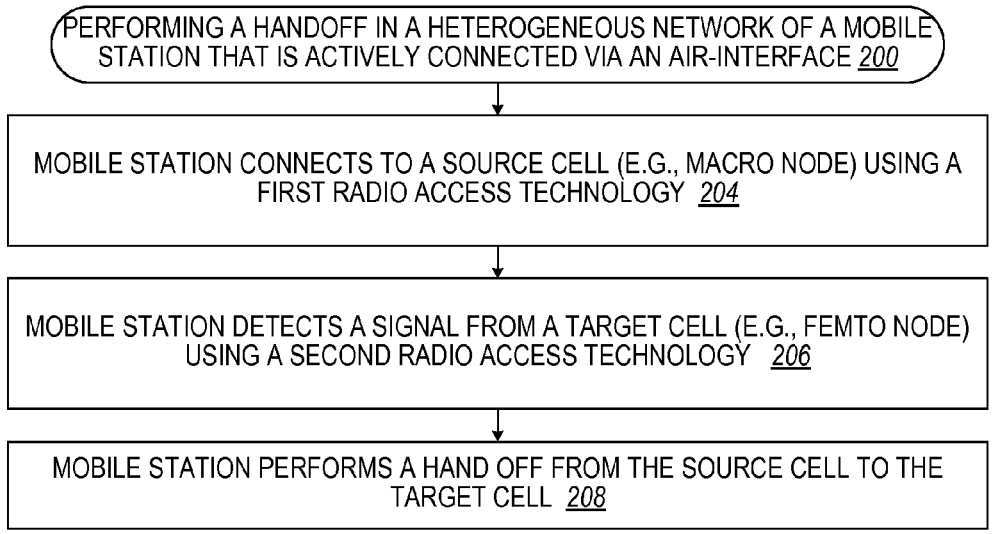
FIG. 2A illustrates a flow diagram of a methodology by a mobile station for performing a handoff in a heterogeneous network of a mobile station that is actively connected via an air-interface.

In use, in FIG. 2A a methodology or sequence of operations 200 is depicted for performing a handoff in a heterogeneous network of a mobile station that is actively connected to a source or serving node via an air-interface using a first radio access technology. A mobile station connects to a source cell (e.g., macro node) to conduct an active session over an air-interface using a first radio access technology (block 204). The mobile station detects a signal from a femto node using a second radio access technology concurrently with using the first radio access technology (block 206). The mobile station performs an active hand-in from the macro node to the femto node (block 208).

Figure 2B:
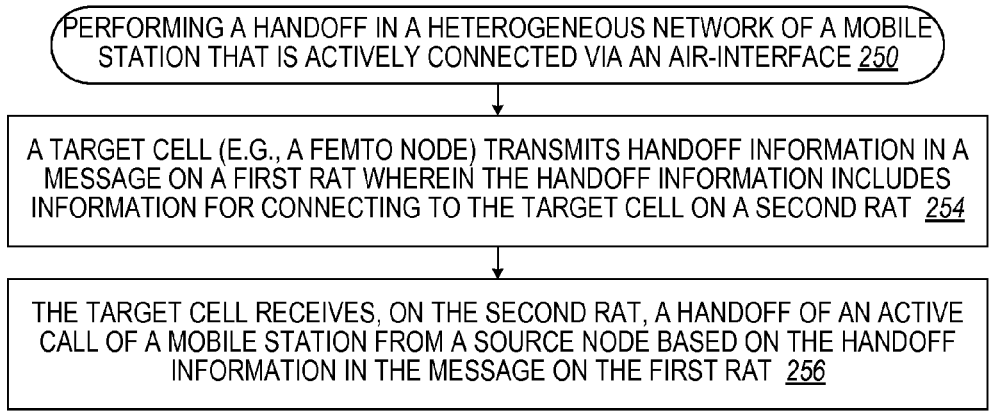
FIG. 2B illustrates a flow diagram of a methodology by a femto node for performing a handoff in a heterogeneous network of a mobile station that is actively connected via an air-interface.

Similarly, in FIG. 2B, a methodology or sequence of operations 250 is depicted for performing a handoff in a heterogeneous network where a mobile station is actively connected to a source or serving node via an air-interface using a first radio access technology. A target cell (e.g., femto node) transmits handoff information in a message on the first radio access technology, wherein the handoff information includes information for connecting to the target cell on a second radio access technology (block 254). The target node receives on a second radio access technology a handoff of an active call of a mobile station from the source node based on the handoff information in the message on the first radio access technology (block 256).

Thus, aspects of the subject innovation enable femto APs to advertise handoff related information on a first Radio Access Technology (RAT) for a multi mode mobile device (e.g., a mobile device capable of multimode operations on a plurality of RATs), and permit such mobile device to identify the femto access point on another RAT (e.g., a second Radio Access Technology.) As such, a multi mode MS/AT (e.g., 1×, HRPD, and the like) can be connected on the first RAT, while independently reading/decoding overhead messages on a second RAT for connection thereto (e.g., connection to a femto access point associated with the second RAT).

This innovation mitigates complexities associated with an active (e.g., a connected) handoff of an MS/AT from a macro base station or access network to a femto access point—wherein the macro system needs to uniquely identify the target femto access point. For example, the femto access point may transmit a first overhead message on a first RAT that includes handoff information for the femto access point on a second RAT. For instance, the handoff information for the femto access point on the second RAT may include a femto access point ID and identifiers for the second RAT. Hence, the mobile device can read the handoff information for the femto access point on the first RAT, and subsequently connect to the femto access point on the second RAT using the handoff information.

According to a further aspect, the advertised handoff information can pertain to identifying the femto access point—such as IP address of the femto access point, or include other handoff-related information, such as an IP address of the gateway, and the like. For example, the handoff information for the femto access point on the second RAT may be transmitted as part of a control message and/or an overhead message, which may be broadcasted regularly by the femto access point to the mobile station on the first RAT. For example, in 1×RAT, the access point identification message (APIDM) can include such advertised information. Likewise, in LTE, such advertised information can be advertised by the femto access point as part of the system information block (SIB). Moreover, the MS/AT can include a plurality of transceivers wherein each transceiver can be assigned to a respective RAT to avoid interruptions when aspects of the subject innovation are implemented. For example, the MS/AT can include multiple ports to record overhead information from multiple RATs (e.g., having a predetermined threshold).

In accordance to a related methodology, initially an MS/AT that is capable of multi mode operations on different RATs is connected to the femto access point on a first RAT. Such MS/AT can receive signals from the femto access point, such as in the form of a substantially strong pilot signal on the first RAT. Based on information advertised on such signal from the femto access point, the MS/AT can further monitor activities of the femto access point on an overhead channel pertaining to a second RAT supported by the femto access point. Once the MS/AT has decoded the second RAT information, the MS/AT can subsequently initiate a handoff process based on the second RAT information, wherein the macrocell will then know which femto access point to contact.

For each femto overhead message transmitted by the femto access point, information can be advertised that assists an MS/AT in performing a connected handoff to another radio access technology. For example, the femto overhead message can include APIDM in HRPD that can advertise IOS_MSC_ID, IOS_CELL_ID or Groups of Pilot PNs for assisting 1×Active Hand-in. Similarly, APIDM in 1× can also advertise Groups of Pilot PNs for assisting HRPD Active Hand-in.

In an aspect, the MS/AT may naturally read the overhead message in an idle RAT if the idle RAT already performs idle handoff. In an exemplary aspect, even when the MS/AT is active on HRPD, the MS/AT may still monitor for a 1× Page. Otherwise, based on APPIM on a first, active RAT, the MS/AT can become aware of being in femtocell coverage and trigger monitoring of overhead messages on a second, idle RAT. In an aspect, on both 1× and HRPD APIDM, the subject innovation supplies handoff information for a second radio access technology. It is to be appreciated that similar information can also be broadcasted/supplied, and the subject innovation incorporated as part of other technologies on the same access point; such as LTE, WiMAX, Wi-Fi, Zigbee, and BLUETOOTH.

Figure 3A:
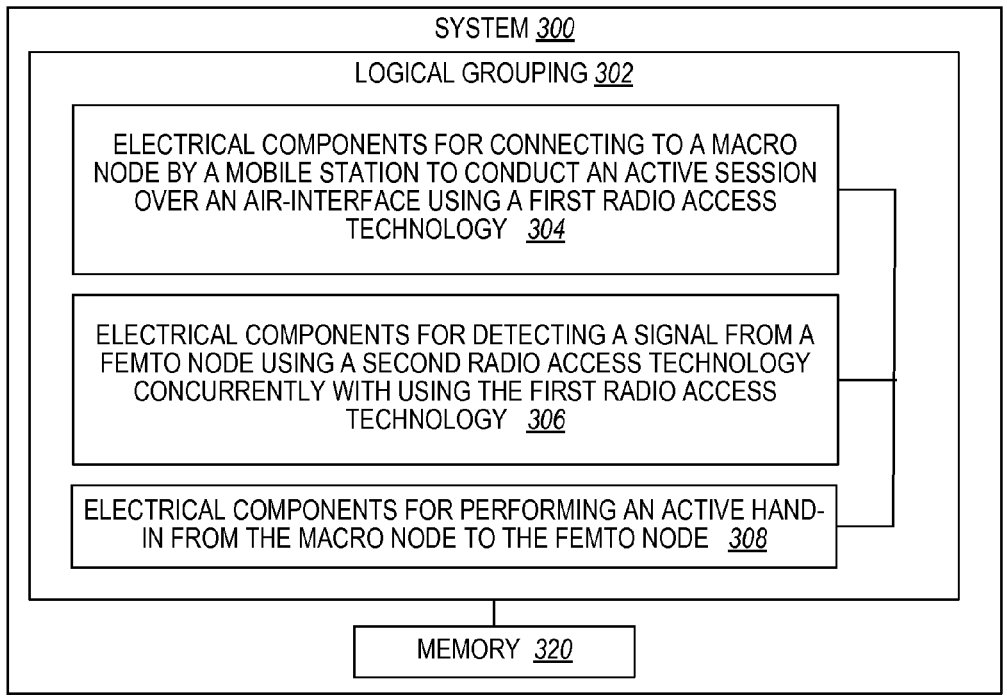

With reference to FIG. 3A, illustrated is a system 300 for performing a handoff in a heterogeneous network where a mobile station is actively connected to a source or serving node via an air-interface using a first radio access technology. For example, system 300 can reside at least partially within user equipment (UE). It is to be appreciated that system 300 is represented as including functional blocks, which can be functional blocks that represent functions implemented by a computing platform, processor, software, or combination thereof (e.g., firmware). System 300 includes a logical grouping 302 of electrical components that can act in conjunction. For instance, logical grouping 302 can include an electrical component for connecting to a macro node by a mobile station to conduct an active session over an air-interface using a first radio access technology 304. Moreover, logical grouping 302 can include an electrical component for detecting a signal from a femto node using a second radio access technology concurrently with using the first radio access technology 306. In addition, logical grouping 302 can include an electrical component for performing an active hand-in from the macro node to the femto node 308. Additionally, system 300 can include a memory 320 that retains instructions for executing functions associated with electrical components 304-308. While shown as being external to memory 320, it is to be understood that one or more of electrical components 304-308 can exist within memory 320.

Figure 3B:
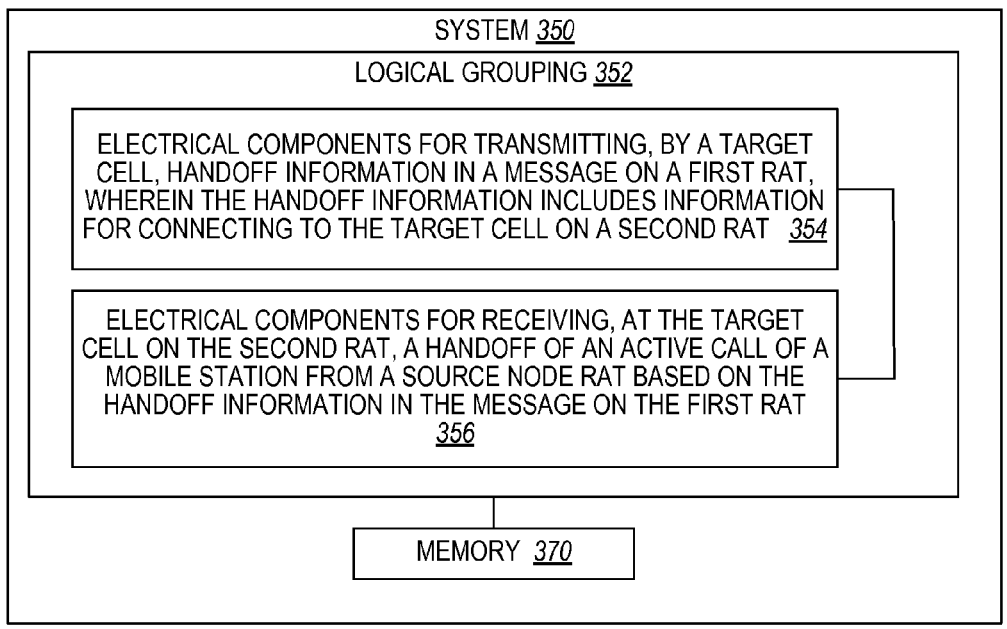

With reference to FIG. 3B, illustrated is a system 350 for performing a handoff in a heterogeneous network where a mobile station is actively connected to a source or serving node via an air-interface using a first radio access technology. For example, system 350 can reside at least partially within a network entity (e.g., femto access point, femtocell, femto node, macrocell). It is to be appreciated that system 350 is represented as including functional blocks, which can be functional blocks that represent functions implemented by a computing platform, processor, software, or combination thereof (e.g., firmware). System 350 includes a logical grouping 352 of electrical components that can act in conjunction. For instance, logical grouping 352 can include an electrical component for transmitting, by a target cell, handoff information in a message on a first radio access technology, wherein the handoff information includes information for connecting to the target cell on a second radio access technology 354. Moreover, logical grouping 352 can include an electrical component for receiving, at the target cell on the second radio access technology, a handoff of an active call of a mobile station from a source node based on the handoff information in the message on the first radio access technology 356. Additionally, system 350 can include a memory 320 that retains instructions for executing functions associated with electrical components 354-356. While shown as being external to memory 320, it is to be understood that one or more of electrical components 354-356 can exist within memory 320.

Figure 4A:
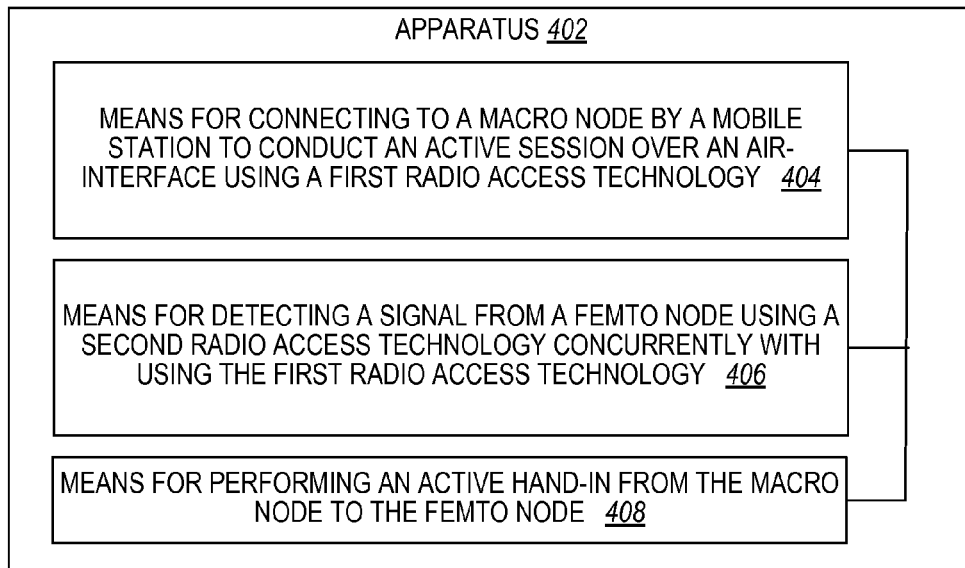

In FIG. 4A, an apparatus 402 is depicted for performing a handoff in a heterogeneous network where a mobile station is actively connected to a source or serving node via an air-interface using a first radio access technology. Means 404 are provided for connecting to a macro node by a mobile station to conduct an active session over an air-interface using a first radio access technology. Means 406 are provided for detecting a signal from a femto node using a second radio access technology concurrently with using the first radio access technology. Means 408 are provided for performing an active hand-in from the macro node to the femto node.

Figure 4B:
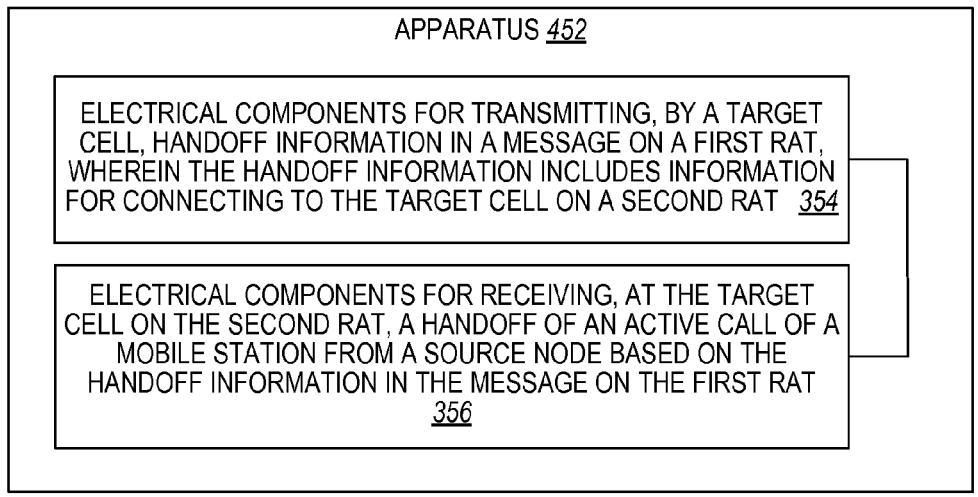

In FIG. 4B, an apparatus 452 is depicted for performing a handoff in a heterogeneous network wherein a mobile station is actively connected to a source or serving node via an air-interface using a first radio access technology. The apparatus comprises means 454 for transmitting, by a target cell, handoff information in a message on a first radio access technology, wherein the handoff information includes information for connecting to the target cell on a second radio access technology. The apparatus comprises means 456 for receiving, at the target cell on the second radio access technology, a handoff of an active call of a mobile station from a source node on the second radio access technology based on the handoff information in the message on the first radio access technology.

In some aspects the teachings herein may be employed in a network that includes macro scale coverage (e.g., a large area cellular network such as a 3G networks, typically referred to as a macrocell network) and smaller scale coverage (e.g., a residence-based or building-based network environment). As an access terminal (AT) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node or access point, a femto node or access point, or a pico node or access point may be referred to as a macrocell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macrocell, macro access point and so on. Also, a femto node may be configured or referred to as a Home NodeB, Home eNodeB, access point base station, femto cell, femto access point, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

Figure 5:
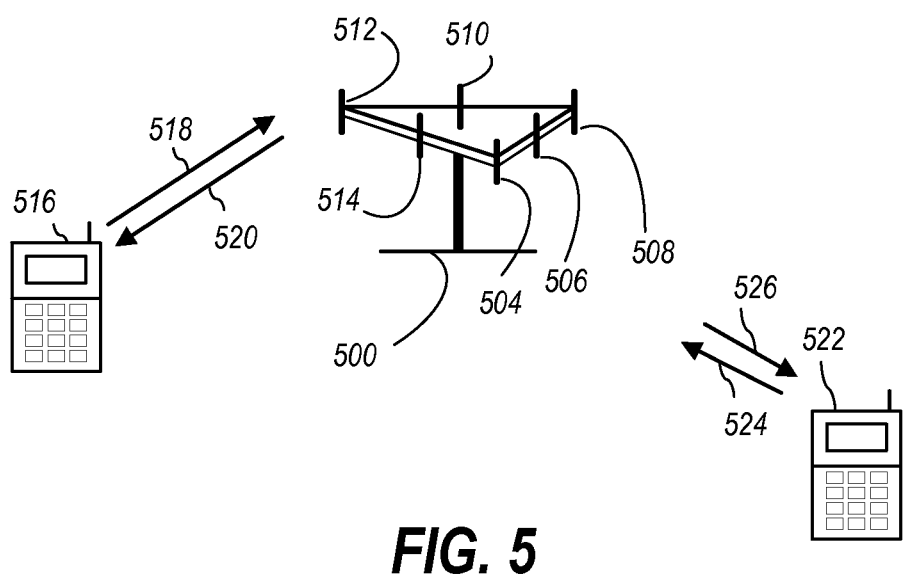
FIG. 5 illustrates a schematic diagram of an exemplary operating environment of a multiple access wireless communication system.

Referring to FIG. 5, a multiple access wireless communication system according to one aspect is illustrated. An access point (AP) 500 includes multiple antenna groups, one including 505 and 506, another including 508 and 510, and an additional including 512 and 514. In FIG. 5, only two antennas are shown for each antenna group, however, more or fewer antennas may be utilized for each antenna group. Access terminal (AT) 516 is in communication with antennas 512 and 514, where antennas 512 and 514 transmit information to access terminal 516 over forward link 520 and receive information from access terminal 516 over reverse link 518. Access terminal 522 is in communication with antennas 506 and 508, where antennas 506 and 508 transmit information to access terminal 522 over forward link 526 and receive information from access terminal 522 over reverse link 524. In a FDD (Frequency Division Duplex) system, communication links 518, 520, 524 and 526 may use different frequencies for communication. For example, forward link 520 may use a different frequency then that used by reverse link 518.

Each group of antennas and/or the area in which they are designed to communicate is often referred to as a sector of the access point. In the aspect, antenna groups each are designed to communicate to access terminals in a sector, of the areas covered by access point 500.

In communication over forward links 520 and 526, the transmitting antennas of access point 500 utilize beamforming in order to improve the signal-to-noise ratio of forward links for the different access terminals 516 and 522. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
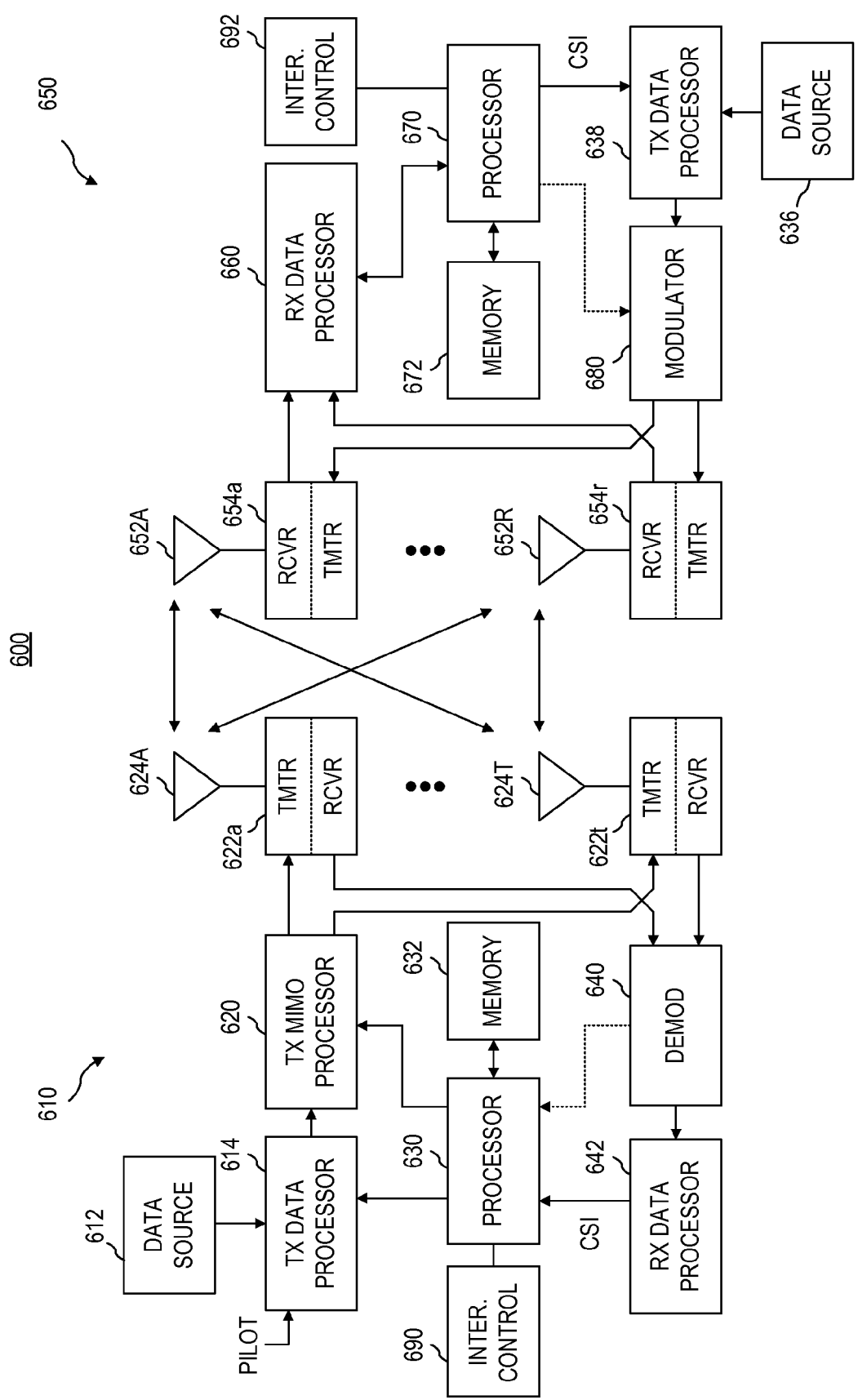
FIG. 6 illustrates a schematic diagram of an exemplary multiple input multiple output (MIMO) system between a mobile station and a macro or femto node.

The teachings herein may be incorporated into a node (e.g., a device) employing various components for communicating with at least one other node. FIG. 6 depicts several sample components that may be employed to facilitate communication between nodes. Specifically, FIG. 6 illustrates a wireless device 610 (e.g., an access point) and a wireless device 650 (e.g., an access terminal) of a MIMO system 600. At the device 610, traffic data for a number of data streams is provided from a data source 612 to a transmit (TX) data processor 614.

In some aspects, each data stream is transmitted over a respective transmit antenna. The TX data processor 614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK (Binary Phase Shift Keying), QPSK (Quadrature Phase-Shift Keying), M-PSK (Multiple or M-ary Phase Shift Keying), or M-QAM (Multiple Quadrature Amplitude Modulation)) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers (XCVR) 622a through 622t. In some aspects, the TX MIMO processor 620 applies beamforming weights to the symbols of the data streams and to the antenna from which the symbol is being transmitted.

Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622a through 622t are then transmitted from $N_T$ antennas 624a through 624t, respectively.

At the device 650, the transmitted modulated signals are received by $N_R$ antennas 652a through 652r and the received signal from each antenna 652 is provided to a respective transceiver (XCVR) 654a through 654r. Each transceiver 654 conditions (e.g., filters, amplifies, and downconverts) a respective received signal, digitizes the conditioned signal to provide samples, and further processes the samples to provide a corresponding "received" symbol stream.

A receive (RX) data processor 660 then receives and processes the $N_R$ received symbol streams from $N_R$ transceivers 654 based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

In one aspect, one receiver chain can be borrowed for decoding the other technology overhead. In particular, detecting the signal from target node that uses a second radio access technology can be achieved by demodulating the signal at least in part at a mobile station by utilizing a receiver chain that is in use by the first radio access technology.

A processor 670 periodically determines which pre-coding matrix to use (discussed below). The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654a through 654r, and transmitted back to the device 610.

At the device 610, the modulated signals from the device 650 are received by the antennas 624, conditioned by the transceivers 622, demodulated by a demodulator (DEMOD) 640, and processed by a RX data processor 642 to extract the reverse link message transmitted by the device 650. The processor 630 then determines which pre-coding matrix to use for determining the beam-forming weights then processes the extracted message.

In one aspect, detecting the signal from target node that uses a second radio access technology can be achieved by demodulating the signal at least in part at a mobile station by utilizing a demodulation finger in a rake receiver that is in use by the first radio access technology.

FIG. 6 also illustrates that the communication components may include one or more components that perform interference control operations as taught herein. For example, an interference (INTER.) control component 690 may cooperate with the processor 630 and/or other components of the device 610 to send/receive signals to/from another device (e.g., device 650) as taught herein. Similarly, an interference control component 692 may cooperate with the processor 670 and/or other components of the device 650 to send/receive signals to/from another device (e.g., device 610). It should be appreciated that for each device 610 and 650 the functionality of two or more of the described components may be provided by a single component. For example, a single processing component may provide the functionality of the interference control component 690 and the processor 630 and a single processing component may provide the functionality of the interference control component 692 and the processor 670.

Figure 7:
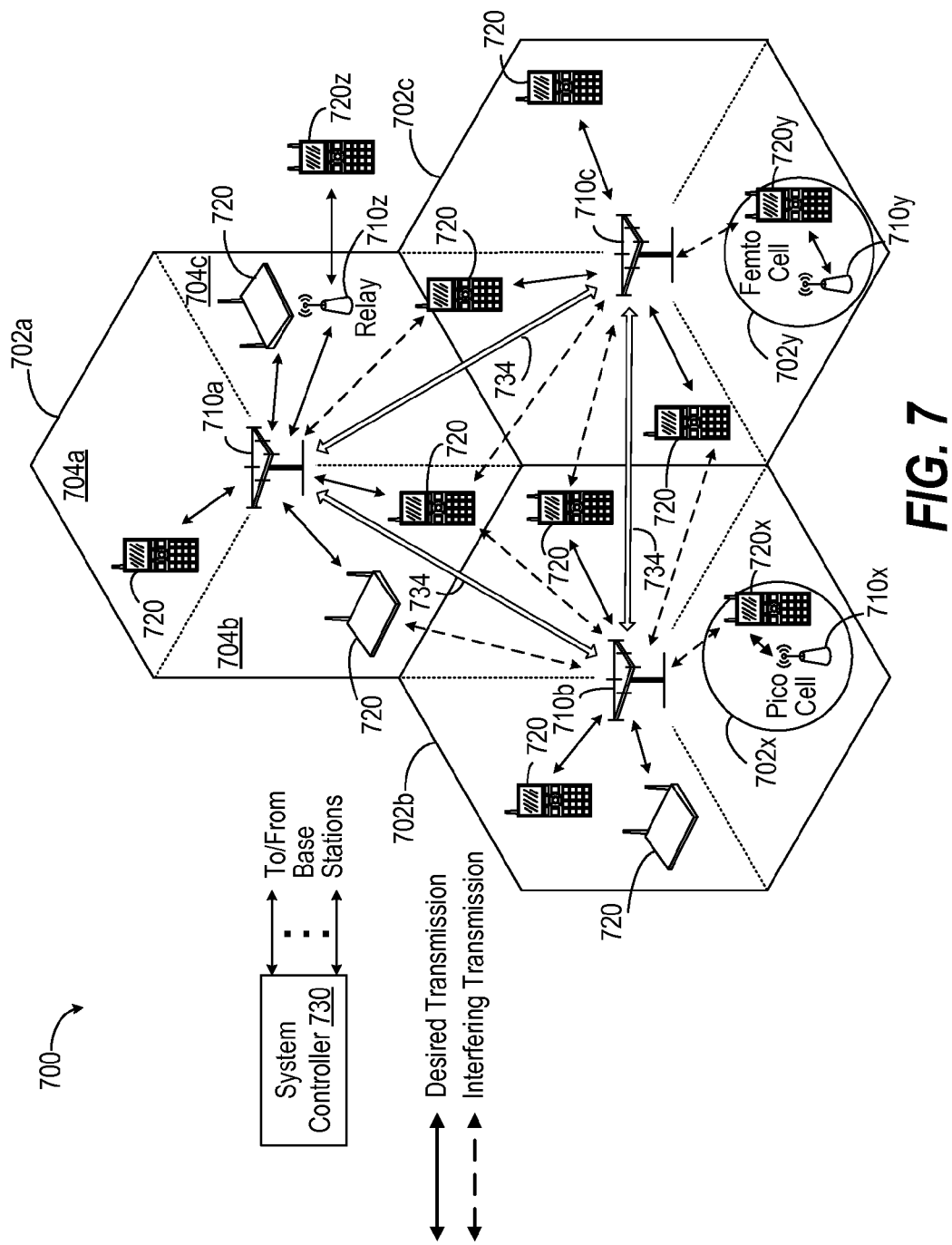
FIG. 7 illustrates a diagram of a cellular macrocell interspersed with femto cells, pico cells, and serviced mobile stations.

In the example shown in FIG. 7, base stations 710a, 710b and 710c may be macro base stations for macrocells 702a, 702b and 702c, respectively. Base station 710x may be a pico base station for a pico cell 702x communicating with terminal 720x. Base station 710y may be a femto base station for a femto cell 702y communicating with terminal 720y. Although not shown in FIG. 7 for simplicity, the macrocells may overlap at the edges. The pico and femto cells may be located within the macrocells (as shown in FIG. 7) or may overlap with macrocells and/or other cells.

Wireless network 700 may also include relay stations, e.g., a relay station 710z that communicates with terminal 720z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 730 may couple to a set of base stations and provide coordination and control for these base stations. Network controller 730 may be a single network entity or a collection of network entities. Network controller 730 may communicate with base stations 710 via a backhaul. Backhaul network communication 734 can facilitate point-to-point communication between base stations 710a-710c employing such a distributed architecture. Base stations 710a-710c may also communicate with one another, e.g., directly or indirectly via wireless or wireline backhaul.

Wireless network 700 may be a homogeneous network that includes only macro base stations (not shown in FIG. 7). Wireless network 700 may also be a heterogeneous network that includes base stations of different types, e.g., macro base stations, pico base stations, home base stations, relay stations, etc. These different types of base stations may have different transmit power levels, different coverage areas, and different impact on interference in wireless network 700. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 720 may be dispersed throughout wireless network 700, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 7, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 700 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

In one aspect, to improve system capacity, the coverage area 702a, 702b, or 702c corresponding to a respective base station 710a-710c can be partitioned into multiple smaller areas (e.g., areas 704a, 704b, and 704c). Each of the smaller areas 704a, 704b, and 704c can be served by a respective base transceiver subsystem (BTS, not shown). As used herein and generally in the art, the term "sector" can refer to a BTS and/or its coverage area depending on the context in which the term is used. In one example, sectors 704a, 704b, 704c in a cell 702a, 702b, 702c can be formed by groups of antennas (not shown) at base station 710, where each group of antennas is responsible for communication with terminals 720 in a portion of the cell 702a, 702b, or 702c. For example, a base station 710 serving cell 702a can have a first antenna group corresponding to sector 704a, a second antenna group corresponding to sector 704b, and a third antenna group corresponding to sector 704c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

Figure 8:
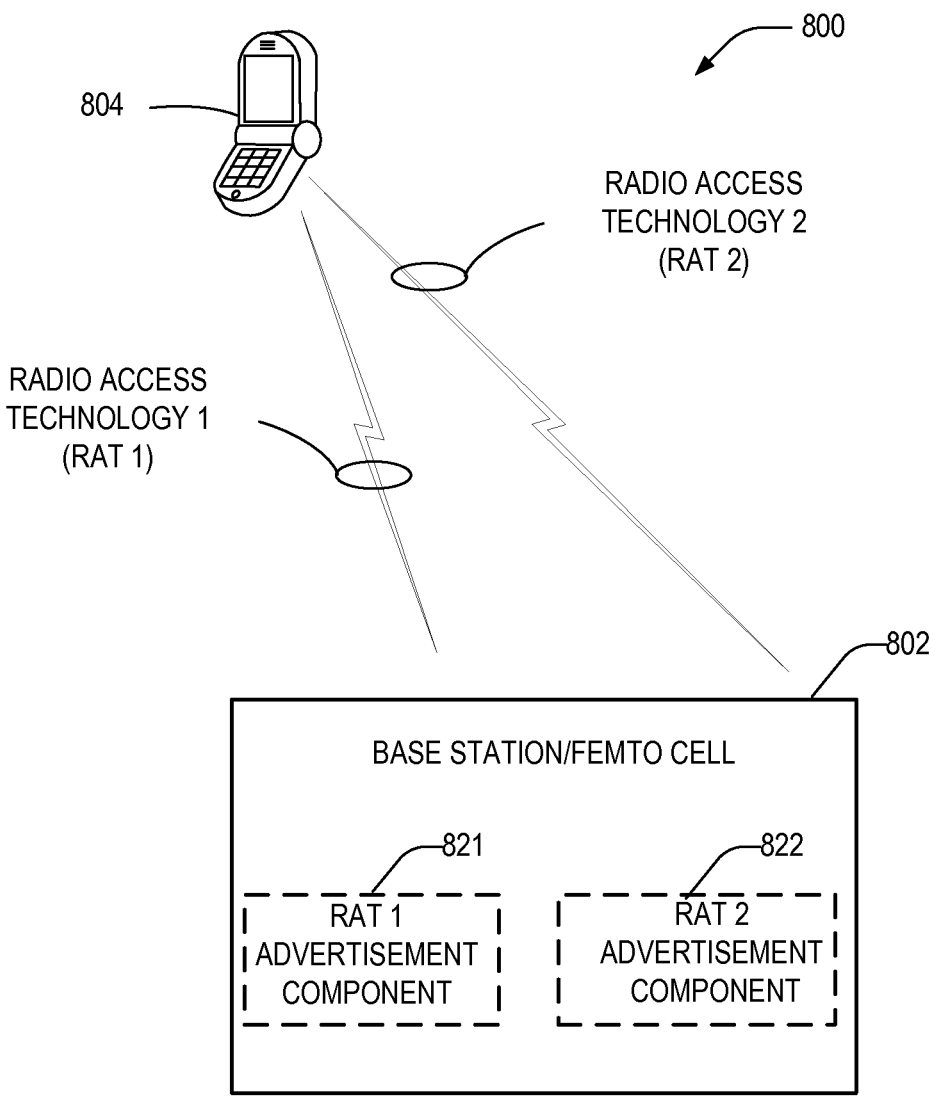
FIG. 8 illustrates a schematic diagram of a multimode wireless communication.

FIG. 8 illustrates a wireless communication system 800 in accordance with various aspects presented herein is illustrated. The MS/AT 804 can be a multimode mobile device that is capable of multimode operations on both RAT 1 and RAT 2. Such MS/AT 804 can be connected to the femto cell on RAT 1, and during such active connected mode can further independently read/encode overhead messages on a second RAT for connection thereto (e.g., connection to a femto cell associated with the second RAT.) The RAT 1 advertisement component 821 and the RAT 2 advertisement component 822 can uniquely identify the target femto access point for connection of the UE/AT thereto.

The RAT 1 advertisement component 821 and the RAT 2 advertisement component 822 can each supply handoff related information, which pertains to identifying a macrocell—such as IP address of the femto cell, IP address of the gateway, and the like. Such can be provided by including the information about the second RAT, as part of a control messages and overhead, which are broadcasted regularly by the femto cell to the mobile station on the first RAT. For example, in 1×RAT the access point identification message (APIDM) can include such advertised information. Likewise, in LTE RAT such advertised information can be advertised by the femto cell as part of the system information block (SIB). It is to be appreciated that RAT 1 and RAT 2 can be deemed interchangeable as the UE/AT can be initially connected to RAT 2 and then desire an active handoff to RAT 1.

System 800 can comprise one or more femto cells/base stations 802 in one or more sectors that receive, transmit, repeat, and so forth, wireless communication signals to each other and/or to one or more mobile devices 804. Each base station 802 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 804 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

Figure 9:
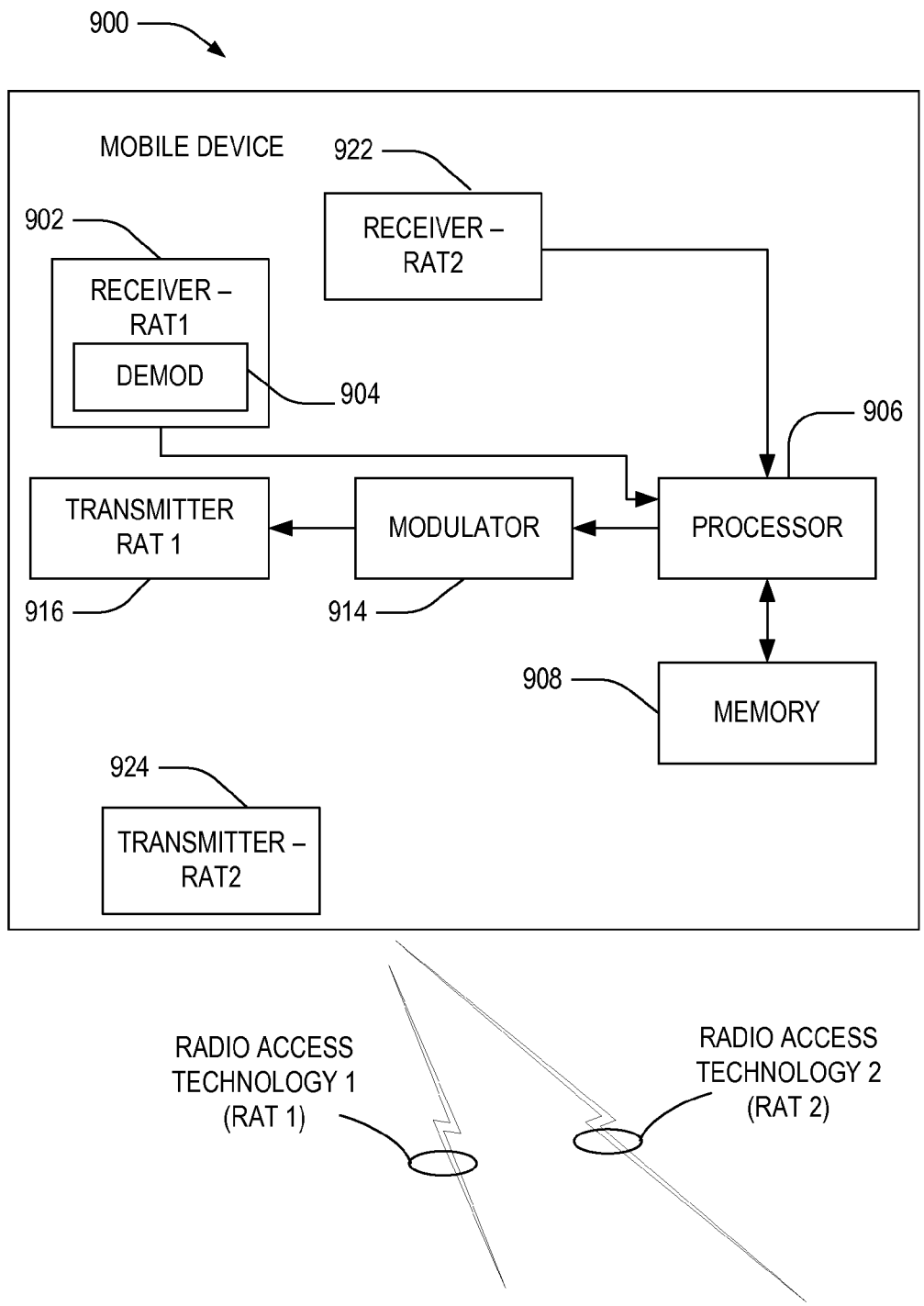
FIG. 9 illustrates a schematic diagram of a multimode mobile device.

FIG. 9 illustrates a multi mode mobile device according to a further aspect of the subject innovation. The multi mode mobile device 900 can be connected to a femto cell on RAT 1 and simultaneously receive handoff related information on RAT 2. As such, a multi mode MS/AT (e.g., 1×, HRPD, and the like) can be connected on the first RAT, while independently reading/decoding overhead messages on a second RAT for connection thereto (e.g., connection to a femto cell associated with the second RAT.) Such mitigates complexities associated with an active (e.g., a connected) handoff of an MS/AT from a macro base stations or access networks to a femtocell, wherein the macro system needs to uniquely identify the target femto access point. Moreover, the mobile device/access terminal 900 can include a plurality of transceivers 902, 922, 924, 916—wherein each transceiver can be assigned to a respective RAT—to avoid interruptions when aspects of the subject innovation are implemented. For example, the AT/mobile terminal can include multiple ports—to record overhead of multiple RATs (e.g., having a predetermined thresholds).

The mobile device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE (Minimum Mean Squared Error) receiver, and can comprise a demodulator 904 that can demodulate received symbols and provide them to a processor 906 for channel estimation. According to an example, receiver 902 can obtain an advertised signal that follows an identification of a base station thereto. Processor 906 can be a processor dedicated to analyzing information received by receiver 902 and/or generating information for transmission by a transmitter 916, a processor that controls one or more components of mobile device 900, and/or a processor that both analyzes information received by receiver 902, generates information for transmission by transmitter 916, and controls one or more components of mobile device 900.

Mobile device 900 can additionally comprise memory 908 that is operatively coupled to processor 906 and that can store data to be transmitted, received data, and any other suitable information related to performing the various actions and functions set forth herein. Memory 908, for instance, can store protocols and/or algorithms associated with analyzing obtained signals related to adapting number of antennas that are advertised by a base station in a wireless communication system. Such adaptive features in determining the number of antennas enable the base station(s) to intelligently balance requirements of legacy UE and new UE (e.g., LTE-A) for an overall efficient operation of the wireless system taken as a whole. Furthermore, memory 908 can store protocols and/or algorithms associated with balancing performance gain for new users as an offset for performance degradation for legacy users.

It should be appreciated by one skilled in the art with the benefit of the present disclosure that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory. Although depicted as being separate from the processor 906, it is to be appreciated that the modulator 914 can be part of processor 906 or a number of processors (not shown).

Figure 10:
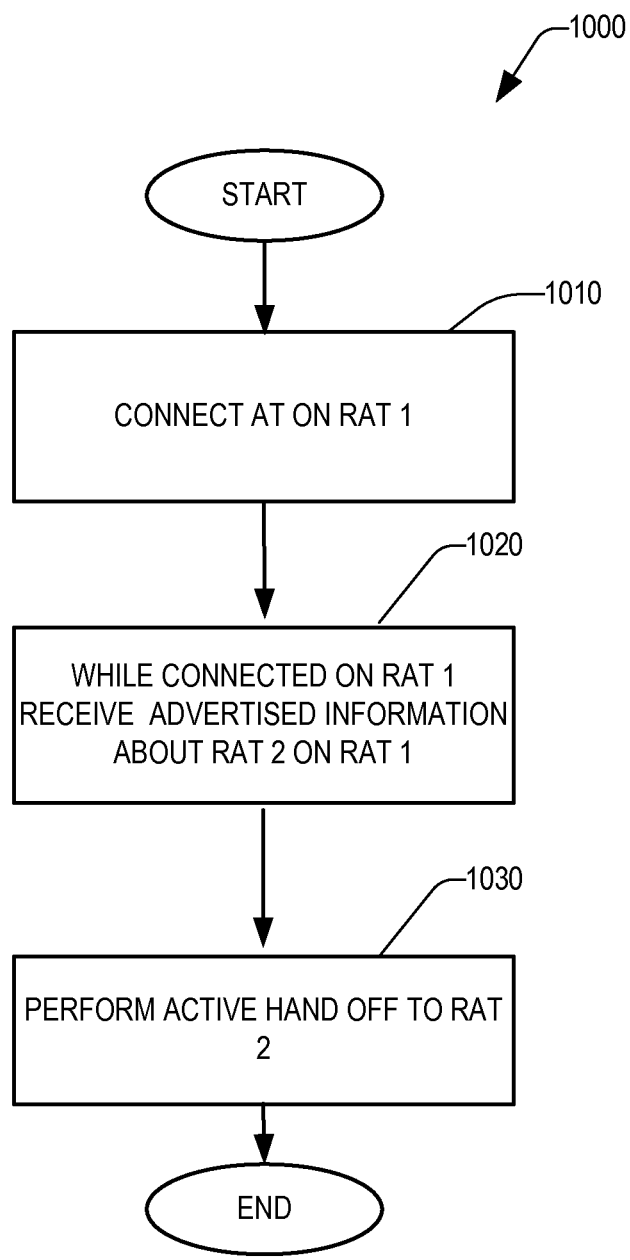
FIG. 10 illustrates a flow diagram of a methodology for utilizing two different RATs.

FIG. 10 illustrates a related methodology 1000 according to a particular aspect of the subject innovation. Initially and at 1010 a mobile device that is capable of multimode operations on different RATs is connected to the femto cell on a RAT 1. Such mobile device can draw signals from the femto cell, such as in form of a substantially strong pilot on RAT 1. Based on information advertised on such signal from the femto cell, the mobile device can further monitor activities of the femto cell on overhead pertaining to a RAT 2, at 1020. Once the mobile has decoded the RAT 2 information, the mobile can subsequently initiate a handoff process at 1030 wherein the macrocell will then know which femto cell to contact for RAT 2 connection.

Figure 11:
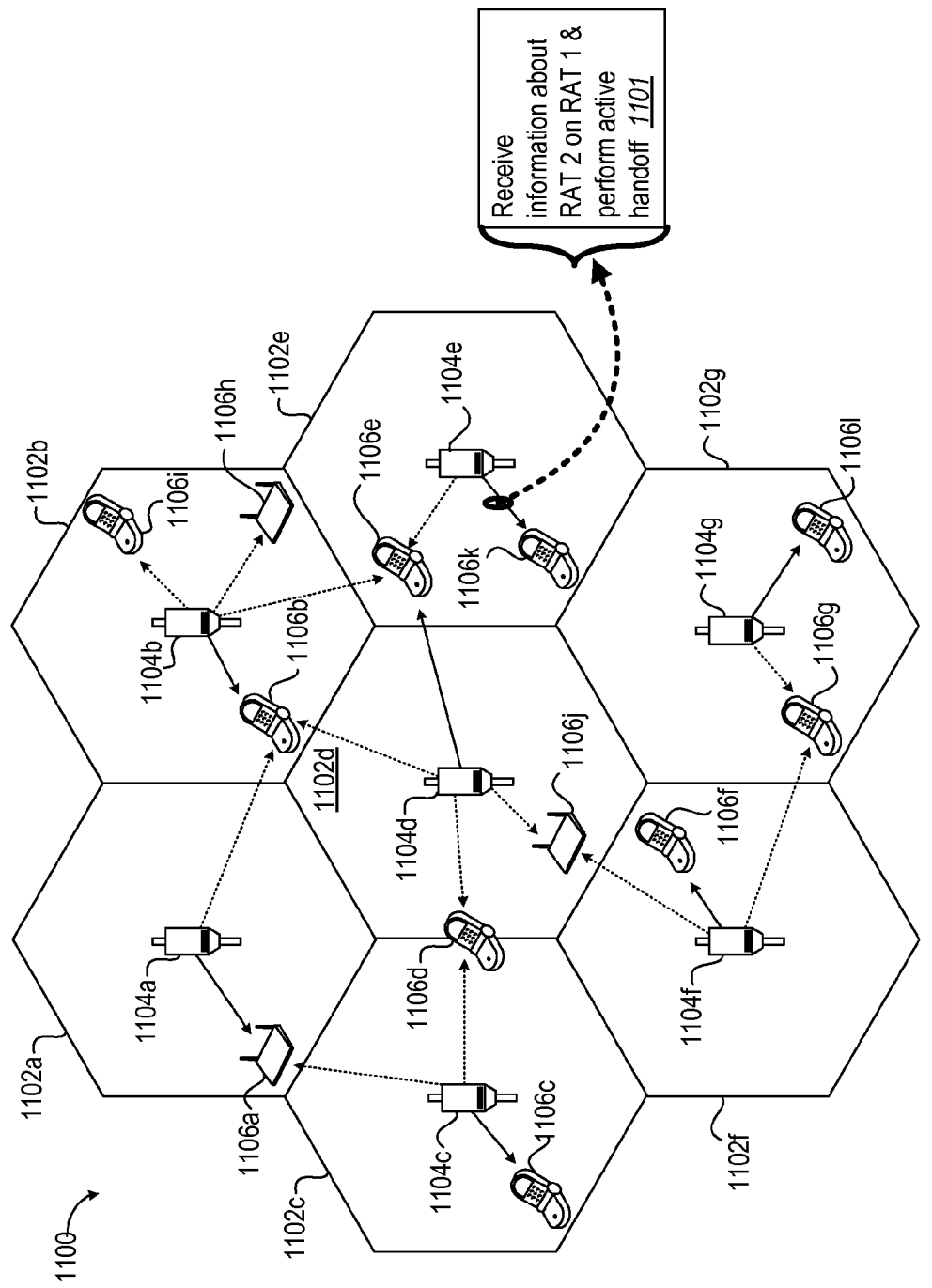
FIG. 11 illustrates a diagram of an exemplary wireless communication system configured to advertise handoff related information on a first RAT for a multi mode mobile device, and permit such mobile device to identify the femto cell on another RAT.

FIG. 11 illustrates an exemplary wireless communication system 1100 configured to advertise handoff related information on a first Radio Access Technology (RAT) for a multi mode mobile device, and permit such mobile device to identify the femto cell on another RAT. As such, a multi mode MS/AT (e.g., 1×, HRPD, and the like) can perform a methodology 1101 for being connected on the first RAT, while independently reading/decoding overhead messages on a second RAT for connection thereto (e.g., connection to a femto cell associated with the second RAT.)

System 1100 provides communication for multiple cells 1102, such as, for example, macrocells 1102a-1102g. Each macrocell 1102a-1102g is serviced by a corresponding access point 1104 (such as access points 1104a-1104g). Each cell 1102a-1102g may be further divided into one or more sectors. Various devices 1106 (including devices 1106a-1106k), are dispersed throughout system 1100. Each device 1106 may communicate with one or more access points 1104 on a forward link (FL) and/or a reverse link (RL) at a given moment, depending upon whether device 1106 is active and whether device 1106 is in soft handoff, for example. Wireless communication system 1100 may provide service over a large geographic region, for example, macrocells 1102a-1102g may cover a few blocks in a neighborhood while advertising information such as the femto cell ID, and identifiers for an active handoff to a second RAT, for example.

By virtue of the foregoing, an apparatus is provided that is operable in a wireless communication system. In particular, means are provided for operating a mobile unit in multi mode in the wireless communication system. Means are provided for advertising a handoff from a first Radio Access Technology (RAT) to a second RAT, by employing active connection of the mobile unit to the first RAT. In an exemplary aspect, the apparatus can further comprise means for uniquely identifying a femto cell associated with the second RAT to the mobile unit.

In another aspect, a method is provided that is used in a wireless communication system. A mobile unit is operated in a multi mode within the wireless communication system; and a handoff is advertised from a first Radio Access Technology (RAT) to a second RAT via an active connection of the mobile unit to the first RAT. In an exemplary aspect, an electronic device executes this method.

In an additional aspect, a computer program product comprises a computer-readable medium comprising code. A first set of codes causes a computer to operate a mobile unit in multi mode in a wireless communication system. A second set of codes causes the computer to advertise a handoff from a first Radio Access Technology (RAT) to a second RAT via an active connection of the mobile unit to the first RAT.

In a further aspect, an apparatus is provided that is operable in a wireless communication system. To that end, a processor supplies multi mode operation for a mobile unit in a wireless communication system and advertises a handoff from a first Radio Access Technology (RAT) to a second RAT by employing an active connection of the mobile unit to the first RAT. A memory is coupled to the processor for storing data.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for performing a handoff in a heterogeneous network of a mobile station that is connected via an air-interface, comprising:
    connecting to a source node by the mobile station, the connecting being performed using a first radio access technology, wherein the source node comprises a macrocell;
    detecting a signal from a target node on a second radio access technology while connected to the source node on the first radio access technology, wherein the detecting is performed by demodulating the signal at least in part at the mobile station by utilizing a receiver chain or a demodulation finger in a rake receiver that is in use by the first radio access technology, and wherein detecting the signal from the target node further comprises detecting an advertisement of handoff information for performing a handoff from the source node to the target node on the second radio access technology different from the first radio access technology, and wherein the handoff information comprises a group of pilot pseudo noise codes, and wherein the target node comprises a femtocell; and
    performing the handoff from the source node to the target node.

2. The method of claim 1, wherein the detecting the signal from the target node is performed concurrently with using the first radio access technology.

3. The method of claim 1, wherein the detecting the signal from the target node further comprises detecting a unique identifier of the target node.

4. The method of claim 3, further comprising detecting the unique identifier of the target node for handoff on the first radio access technology.

5. The method of claim 4, wherein the detecting the signal from the target node further comprises detecting an access point identification message from a 1× air-interface.

6. The method of claim 1, wherein the detecting the signal from the target node further comprises detecting a system information block from an LTE air-interface.

7. The method of claim 1, wherein the detecting the signal from the target node further comprises detecting identifiers for a type of radio access technology, a mobile switching center, and a radio access network cell.

8. The method of claim 1, further comprising transmitting a pilot strength measurement report to the source node including identifying information from the detected signal.

9. The method of claim 1, wherein the first and second radio access technologies are each selected from a group consisting of a wireless wide area network, a wireless local access network, and a wireless personal access network.

10. The method of claim 1, wherein the detecting the signal from the target node further comprises detecting an overhead channel containing unique values of target mobile switching center identifier and target cell identifier; and
    wherein the performing the handoff from the source node to the target node further comprises performing a hard handover using the unique values.

11. The method of claim 1, wherein the connecting to the source node by the mobile station and the detecting the signal from the target node further comprise respectively triggering access to an idle radio access technology to establish a traffic connection and detecting handoff information communicated via a data message.

12. The method of claim 11, wherein the detecting the handoff information communicated via the data message further comprises exchanging information during an Internet Protocol (IP) service discovery protocol.

13. The method of claim 12, wherein the IP service discovery protocol comprises Universal Plug and Play (UPnP).

14. At least one processor for performing a handoff in a heterogeneous network of a mobile station that is connected via an air-interface, comprising:
    a first module for connecting to a source node by a mobile station, the connecting being performed using a first radio access technology, wherein the source node comprises a macrocell;
    a second module for detecting a signal from a target node on a second radio access technology while connected to the source node on the first radio access technology, wherein the detecting is performed by demodulating the signal at least in part at the mobile station by utilizing a receiver chain or a demodulation finger in a rake receiver that is in use by the first radio access technology, and wherein to detect the signal from the target node, the second module further comprises detecting an advertisement of handoff information for performing a handoff from the source node to the target node on the second radio access technology different from the first radio access technology, and wherein the handoff information comprises a group of pilot pseudo noise codes, and wherein the target node comprises a femtocell; and
    a third module for performing the handoff from the source node to the target node.

15. A computer program product for performing a handoff in a heterogeneous network of a mobile station that is connected via an air-interface, comprising:
    a non-transitory computer-readable medium storing sets of codes comprising,
        a first set of codes for causing a computer to connect to a source node by a mobile station, the connecting being performed using a first radio access technology, wherein the source node comprises a macrocell;
        a second set of codes for causing the computer to detect a signal from a target node on a second radio access technology while connected to the source node on the first radio access technology, wherein the detecting is performed by demodulating the signal at least in part at the mobile station by utilizing a receiver chain or a demodulation finger in a rake receiver that is in use by the first radio access technology, and wherein to detect the signal from the target node, the second set of codes further causes the computer to detect an advertisement of handoff information for performing a handoff from the source node to the target node on the second radio access technology different from the first radio access technology, and wherein the handoff information comprises a group of pilot pseudo noise codes, and wherein the target node comprises a femtocell; and a third set of codes for causing the computer to perform the handoff from the source node to the target node.

16. An apparatus for performing a handoff in a heterogeneous network of a mobile station that is connected via an air-interface, comprising:

means for connecting to a source node by a mobile station, the connecting being performed using a first radio access technology, wherein the source node comprises a macrocell;

means for detecting a signal from a target node on a second radio access technology while connected to the source node on the first radio access technology, wherein the detecting is performed by demodulating the signal at least in part at the mobile station by utilizing a receiver chain or a demodulation finger in a rake receiver that is in use by the first radio access technology, and wherein the means for detecting the signal from the target node further comprise means for detecting an advertisement of handoff information for performing a handoff from the source node to the target node on the second radio access technology different from the first radio access technology, and wherein the handoff information comprises a group of pilot pseudo noise codes, and wherein the target node comprises a femtocell; and means for performing the handoff from the source node to the target node.

17. An apparatus for performing a handoff in a heterogeneous network of a mobile station that is connected via an air-interface, comprising:

a first transceiver for connecting to a source node by a mobile station, the connecting being performed using a first radio access technology, wherein the source node comprises a macrocell;

a second transceiver for detecting a signal from a target node on a second radio access technology while connected to the source node on the first radio access technology, wherein the detecting is performed by demodulating the signal at least in part at the mobile station by utilizing a receiver chain or a demodulation finger in a rake receiver that is in use by the first radio access technology, and wherein the second transceiver is further for detecting an advertisement of handoff information for performing a handoff from the source node to the target node on the second radio access technology different from the first radio access technology, and wherein the handoff information comprises a group of pilot pseudo noise codes, and wherein the target node comprises a femtocell; and a computing platform for performing the handoff from the source node to the target node.

18. The apparatus of claim 17, wherein the second transceiver is further for detecting the signal from the target node concurrently with using the first radio access technology.

19. The apparatus of claim 17, wherein the second transceiver is further for detecting the signal from the target node by detecting a unique identifier of the target node.

20. The apparatus of claim 19, wherein the first transceiver is further for detecting the unique identifier of the target node for handoff on the first radio access technology.

21. The apparatus of claim 20, wherein the second transceiver is further for detecting the signal from the target node by detecting an access point identification message from a 1× air-interface.

22. The apparatus of claim 17, wherein the second transceiver is further for detecting the signal from the target node by detecting a system information block from an LTE air-interface.

23. The apparatus of claim 17, wherein the second transceiver is further for detecting the signal from the target node by detecting identifiers for a type of radio access technology, a mobile switching center, and a radio access network cell.

24. The apparatus of claim 17, wherein the first transceiver is further for transmitting a pilot strength measurement report to the source node including identifying information from the detected signal.

25. The apparatus of claim 17, wherein the first and second radio access technologies are each selected from a group consisting of a wireless wide area network, a wireless local access network, and a wireless personal access network.

26. The apparatus of claim 17, wherein the second transceiver is further for detecting the signal from the target node by detecting an overhead channel containing unique values of target mobile switching center identifier and target cell identifier; and wherein the performing the handoff from the source node to the target node further comprises performing a hard handover using the unique values.

27. The apparatus of claim 17, wherein the first transceiver is further for connecting to the source node by the mobile station and the computing platform via the second transceiver is further for detecting the signal from the target node respectively by triggering an idle radio access technology to establish a traffic connection and detecting handoff information communicated via a data message.

28. The apparatus of claim 27, wherein the computing platform via the second transceiver is further for detecting the handoff information communicated via the data message by exchanging information during Internet Protocol (IP) service discovery protocol.

29. The apparatus of claim 28, wherein the computing platform via the second transceiver is further for exchanging information during IP service discovery protocol comprising Universal Plug'n'Play (UPnP).

30. A method for performing a handoff in a heterogeneous network of a mobile station that is connected via an air-interface, comprising:

transmitting, by a target node, handoff information in a message on a first radio access technology to the mobile station having an active call on a second radio access technology different from the first radio access technology, wherein the handoff information includes an advertisement comprising a group of pilot pseudo noise codes for performing a handoff from a source node to the target node on the second radio access technology, wherein the message is demodulated at least in part at the mobile station by utilizing a receiver chain or a demodulation finger in a rake receiver that is in use by the second radio access technology; and receiving, at the target node and on the second radio access technology, a handoff of the active call of the mobile station from the source node on the second radio access technology, the handoff being based on the handoff information in the message transmitted on the first radio access technology to the mobile station.

31. The method of claim 30, wherein the handoff information includes a unique identifier of the target node for connecting to the target node on the first radio access technology.

32. The method of claim 30, wherein the transmitting, by the target node, the handoff information in the message on the first radio access technology further comprises transmitting an access point identification message over a 1× air-interface.

33. The method of claim 30, wherein the transmitting, by the target node, the handoff information in the message on the first radio access technology further comprises transmitting a system information block over an LTE air-interface.

34. The method of claim 30, wherein the transmitting, by the target node, the handoff information in the message on the first radio access technology further comprises transmitting identifiers for a type of radio access technology, a mobile switching center, and a radio access network cell.

35. The method of claim 30, further comprising receiving a pilot strength measurement report from a serviced mobile station and initiating a handoff of the serviced mobile station to the source node.

36. The method of claim 30, wherein the first and second radio access technologies are each selected from a group consisting of a wireless wide area network, a wireless local access network, and a wireless personal access network.

37. The method of claim 30, wherein the transmitting, by the target node, the handoff information in the message on the first radio access technology further comprises transmitting an overhead channel containing unique values of target mobile switching center identifier and target cell identifier; and
    wherein the handoff from the source node to the target node further comprises a hard handover using the unique values.

38. The method of claim 30, wherein the source node comprises a macrocell and the target node comprises a femtocell.

39. At least one processor for performing a handoff in a heterogeneous network of a mobile station that is connected via an air-interface, comprising:
    a first module for transmitting, by a target node, handoff information in a message on a first radio access technology to the mobile station having an active call on a second radio access technology different from the first radio access technology, wherein the handoff information includes an advertisement comprising a group of pilot pseudo noise codes for performing a handoff from a source node to the target node on the second radio access technology, wherein the message is demodulated at least in part at the mobile station by utilizing a receiver chain or a demodulation finger in a rake receiver that is in use by the second radio access technology; and
    a second module for receiving, at the target node and on the second radio access technology, a handoff of the active call of the mobile station from the source node on the second radio access technology, the handoff being based on the handoff information in the message transmitted on the first radio access technology to the mobile station.

40. A computer program product for performing a handoff in a heterogeneous network of a mobile station that is connected via an air-interface, comprising:
    a non-transitory computer-readable medium storing sets of code comprising,
    a first set of codes for causing a computer to transmit, by a target node, handoff information in a message on a first radio access technology to the mobile station having an active call on a second radio access technology different from the first radio access technology, wherein the handoff information includes an advertisement comprising a group of pilot pseudo noise codes for performing a handoff from a source node to the target node on the second radio access technology, wherein the message is demodulated at least in part at the mobile station by utilizing a receiver chain or a demodulation finger in a rake receiver that is in use by the second radio access technology; and
    a second set of codes for causing the computer to receive, at the target node and on the second radio access technology, a handoff of the active call of the mobile station from the source node on the second radio access technology, the handoff being based on the handoff information in the message transmitted on the first radio access technology to the mobile station.

41. An apparatus for performing a handoff in a heterogeneous network of a mobile station that is connected via an air-interface, comprising:
    means for transmitting, by a target node, handoff information in a message on a first radio access technology to the mobile station having an active call on a second radio access technology different from the first radio access technology, wherein the handoff information includes an advertisement comprising a group of pilot pseudo noise codes for performing a handoff from a source node to the target node on the second radio access technology, wherein the message is demodulated at least in part at the mobile station by utilizing a receiver chain or a demodulation finger in a rake receiver that is in use by the second radio access technology; and
    means for receiving, at the target node and on the second radio access technology, a handoff of the active call of the mobile station from the source node on the second radio access technology, the handoff being based on the handoff information in the message transmitted on the first radio access technology to the mobile station.

42. An apparatus for performing a handoff in a heterogeneous network of a mobile station that is connected via an air-interface, comprising:
    a first transceiver for transmitting, by a target node, handoff information in a message on a first radio access technology to the mobile station having an active call on a second radio access technology different from the first radio access technology, wherein the handoff information includes an advertisement comprising a group of pilot pseudo noise codes for performing a handoff from a source node to the target node on the second radio access technology, wherein the message is demodulated at least in part at the mobile station by utilizing a receiver chain or a demodulation finger in a rake receiver that is in use by the second radio access technology; and
    a second transceiver for receiving, at the target node and on the second radio access technology, a handoff of the active call of the mobile station from the source node on the second radio access technology, the handoff being based on the handoff information in the message transmitted on the first radio access technology to the mobile station.

43. The apparatus of claim 42, wherein the handoff information includes a unique identifier of the target node for connecting to the target node on the first radio access technology.

44. The apparatus of claim 43, wherein the first transceiver is further for transmitting, by the target node, the handoff information in the message on the first radio access technology by transmitting an access point identification message over a 1× air-interface.

45. The apparatus of claim 42, wherein the first transceiver is further for transmitting, by the target node, the handoff information in the message on the first radio access technology by transmitting a system information block over an LTE air-interface.

46. The apparatus of claim 42, wherein the first transceiver is further for transmitting, by the target node, the handoff information in the message on the first radio access technology by transmitting identifiers for a type of radio access technology, a mobile switching center, and a radio access network cell.

47. The apparatus of claim 42, wherein the second transceiver is further for receiving a pilot strength measurement report from a serviced mobile station and for initiating a handoff of the serviced mobile station to the source node.

48. The apparatus of claim 42, wherein the first and second radio access technologies are each selected from a group consisting of a wireless wide area network, a wireless local access network, and a wireless personal access network.

49. The apparatus of claim 42, wherein the first transceiver is further for transmitting, by the target node, the handoff information in the message on the first radio access technology by transmitting an overhead channel containing unique values of target mobile switching center identifier and target cell identifier; and wherein the handoff from the source node to the target node further comprises a hard handover using the unique values.

50. The apparatus of claim 42, wherein the source node comprises a macrocell and the target node comprises a femtocell.

* * * * *